US008227543B2

(12) United States Patent
Bizet et al.

(10) Patent No.: US 8,227,543 B2
(45) Date of Patent: Jul. 24, 2012

(54) FLEXIBLE THERMOPLASTIC COMPOSITION WITH IMPROVED RESISTANCE TO THE EFFECT OF OILS, AND USE OF SUCH A COMPOSITION

(75) Inventors: Stephane Bizet, Serquigny (FR); Jean-Jacques Flat, Goupilliers (FR)

(73) Assignee: Arkema France, Colombes (FR)

( * ) Notice: Subject to any disclaimer, the term of this patent is extended or adjusted under 35 U.S.C. 154(b) by 0 days.

(21) Appl. No.: 12/526,097

(22) PCT Filed: Feb. 6, 2008

(86) PCT No.: PCT/FR2008/050180
§ 371 (c)(1),
(2), (4) Date: Dec. 15, 2009

(87) PCT Pub. No.: WO2008/104677
PCT Pub. Date: Sep. 4, 2008

(65) Prior Publication Data
US 2010/0099817 A1    Apr. 22, 2010

(30) Foreign Application Priority Data
Feb. 6, 2007   (FR) ..................................... 07 53094

(51) Int. Cl.
*C08G 63/48* (2006.01)
(52) U.S. Cl. ................ 525/57; 525/59; 525/69; 525/70; 525/77; 525/78; 525/80; 525/178; 525/183; 525/185; 525/190; 525/420; 525/426
(58) Field of Classification Search .................... 525/69, 525/70, 77, 78, 80, 178, 183, 185, 190, 420, 525/426, 57, 59
See application file for complete search history.

(56) References Cited

U.S. PATENT DOCUMENTS

| 5,177,138 | A  | * | 1/1993 | Moriyama et al. ............ 524/437 |
| 5,219,929 | A  |   | 6/1993 | Miyashita et al. |
| 5,342,886 | A  |   | 8/1994 | Glotin et al. |
| 6,177,162 | B1 |   | 1/2001 | Siour et al. |
| 6,846,874 | B2 | * | 1/2005 | Baumert et al. ............. 524/538 |
| 6,875,520 | B2 |   | 4/2005 | Court et al. |
| 2002/0099134 | A1 |   | 7/2002 | Bertin et al. |
| 2005/0112312 | A1 |   | 5/2005 | Baumert et al. |

OTHER PUBLICATIONS

Pizzi, A.; Mittal, K.L.; Handbook of Adhesive Technology, 2003, p. 453-454.*
Liaw, D.J.; Su, B.Y.; Die Angewandte Makromolekulare Chemie, 1993(212), p. 77-91.*

* cited by examiner

*Primary Examiner* — David W Wu
*Assistant Examiner* — Robert Jones, Jr.
(74) *Attorney, Agent, or Firm* — Buchanan Ingersoll & Rooney

(57) ABSTRACT

The invention relates to a flexible thermoplastic composition resistant to the ageing effects of oil, said composition comprising a grafted copolymer containing polyamide blocks and consisting of a polyolefin backbone and at least one polyamide graft. According to the invention, the grafts are attached to the core by the residues of an unsaturated monomer (X) having a function that can react with a polyamide comprising an amine end or a carboxylic acid end; the residues of the unsaturated monomer (X) are attached to the backbone by grafting or copolymerization from the double bond thereof; and the composition comprises between 40 to 90 wt % of the polyolefin core comprising the unsaturated monomer (X); between 5 to 40 wt % of polyamide grafts; and between 5 to 40% of at least one polymer selected from a saponified ethylene/vinyl acetate copolymer and a polyamide.

13 Claims, 2 Drawing Sheets

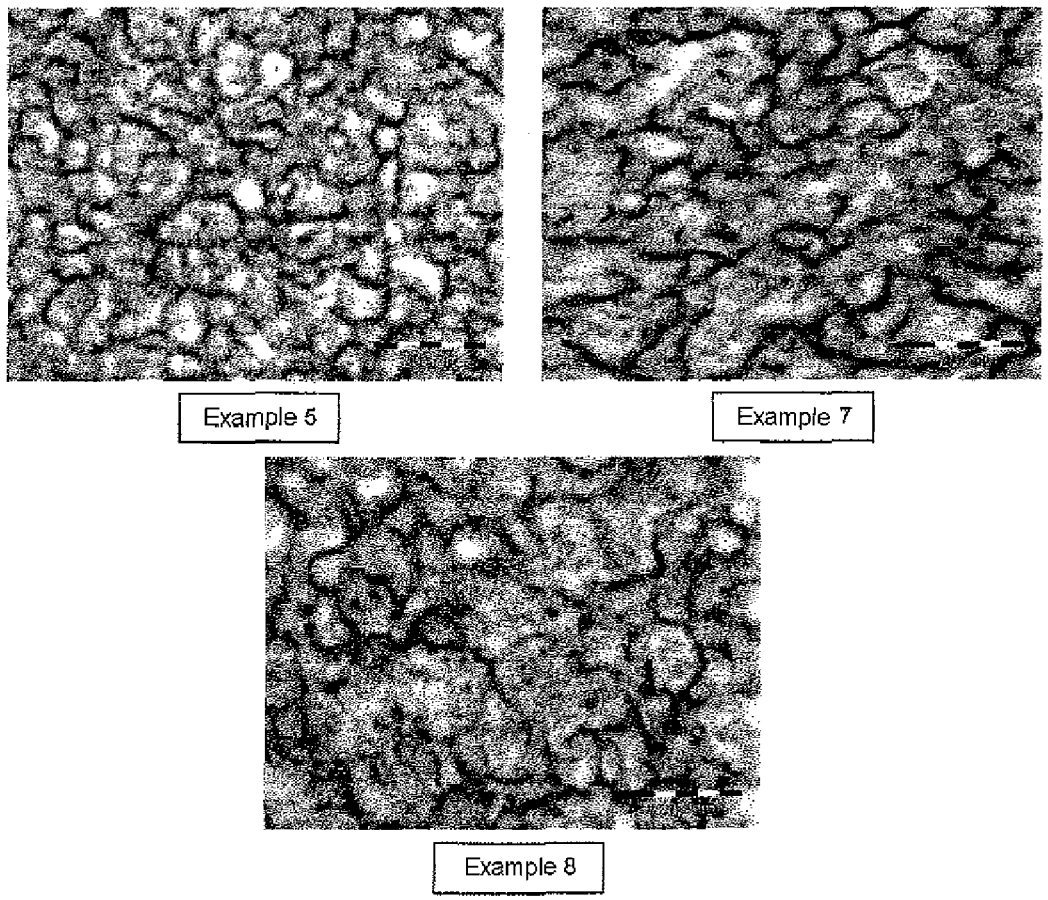
Figure 1: Transmission electron microscopy images of Examples 5, 7 and 8 obtained after staining with ruthenium tetraoxide. The nylon-6 phase appears in black. The scale bar corresponds to 200 nanometres.

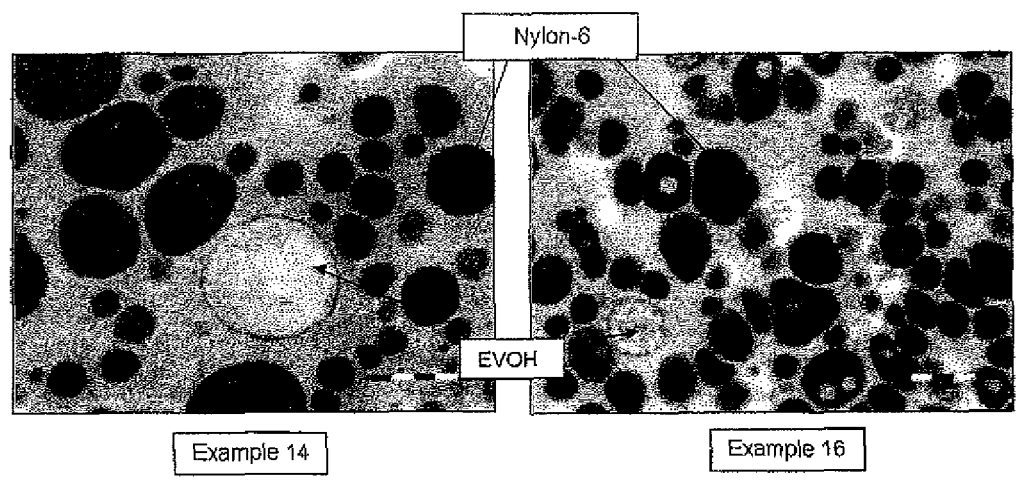
*Figure 2:* Transmission electron microscopy images of Examples 14 and 16 obtained after treatment of the ultrafine sections with phosphotungstic acid.

FLEXIBLE THERMOPLASTIC COMPOSITION WITH IMPROVED RESISTANCE TO THE EFFECT OF OILS, AND USE OF SUCH A COMPOSITION

This application claims benefit, under U.S.C. §119 or §365 of FR 0753094 filed Feb. 6, 2007; U.S. 60/896,313 filed Mar. 22, 2007, and PCT application PCT/FR2008/050180 filed Feb. 6, 2008.

FIELD OF THE INVENTION

The present invention relates to flexible thermoplastic compositions having a high thermomechanical strength and having a good aging resistance in oils. The present invention also relates to the use of such a composition.

The present invention relates more particularly to thermoplastic compositions based on functionalized polyolefins grafted with polyamide units.

Such compositions are used for manufacturing extruded and/or injection-moulded parts for automotive applications. In a non-limiting way, mention may be made of the parts located under the bonnet, designated "under the engine bonnet" in the rest of the description, such parts possibly being used in particular to insulate and protect electrical cables or optical fibres.

BACKGROUND OF THE INVENTION

Described in document WO 02/28959, in the name of the Applicant, is a grafted copolymer having polyamide blocks on a polyolefin backbone that is chosen from ethylene/maleic anhydride and ethylene/alkyl (meth)acrylate/maleic anhydride copolymers, forming a co-continuous nanostructured blend; this gives this copolymer exceptional thermomechanical properties, which are retained when redispersing this grafted copolymer in flexible polyolefins such as the flexible ethylene copolymers.

Such blends have applications as adhesives, films, tarpaulins, calendered products, electrical cables or powders for slush moulding processes for moulding objects.

These grafted olefinic copolymers having polyamide blocks are materials that show, however, mediocre aging resistance in oils, which limits their use in applications in the automotive field, such as parts "under the engine bonnet".

The terms "resistance to oils" or "aging resistance in oils" of these thermoplastic compositions is understood to mean, on the one hand, the level of retention of the mechanical properties, in particular the elongation at break (EB) and the tensile strength (TS), measured in tension, after a period in oil and, on the other hand, the weight and volume swelling after immersion in these oils.

Document U.S. Pat. No. 5,278,229 describes an olefinic composition comprising:
(A) from 50 to 99.5% by weight of a polyolefin resin such as polyethylene or polypropylene;
(B) from 0.4 to 50% by weight of a saponified ethylene vinyl acetate copolymer; and
(C) from 0.1 to 15% by weight of a maleic anhydride-grafted ethylene copolymer that has reacted with a polyamide oligomer having a degree of polymerization >15.

This composition is used in a multilayer structure as an oxygen barrier layer, but does not provide resistance to aging in oils.

Document EP 0 403 109 describes compositions composed of:
  5 to 95% by weight of a saponified ethylene vinyl acetate copolymer;
  95 to 5% by weight of a polyamide of which the terminal amine groups are predominant; and
  0.5 to 10% by weight of a polyolefin modified by an unsaturated carboxylic acid, such as a maleic anhydride-modified polyethylene. These compositions are used to improve the stability of sheets or films formed by extrusion, while avoiding the formation of gels, and they comprise functionalized polyolefin levels of at most 10%.

Document EP 1 022 309 describes compositions based on an ethylene/vinyl alcohol copolymer comprising by weight:
  50 to 98% of an EVOH copolymer;
  1 to 50% of a polyethylene (A), that may be an ethylene/alkyl(meth)acrylate copolymer; and
  1 to 15% of a polymer (B) resulting from the reaction (i) of a copolymer (B1) of ethylene and of an unsaturated monomer X grafted onto or copolymerized with (ii) a copolyamide (B2). The amount of polymer (B), or functionalized polyolefin having reacted with the polyamide, is at most 15% by weight, or an amount well below that of the compositions of the invention.

The objective of the invention is to provide a flexible thermoplastic composition based on functionalized polyolefins grafted by polyamides, which retains a good level of properties, especially in terms of elongation, tensile strength and weight and volume swelling, after aging in oils, all of these properties also being retained by the materials or objects obtained from such a composition.

SUMMARY OF THE INVENTION

The flexible thermoplastic composition based on functionalized polyolefins grafted with polyamides is of the type comprising a grafted copolymer having polyamide blocks, formed from a polyolefin backbone and from at least one polyamide graft in which:
  the grafts are attached to the backbone by the residues of an unsaturated monomer (X) having a functional group capable of reacting with a polyamide having an amine end group or a carboxylic acid end group;
  the residues of the unsaturated monomer (X) are attached to the backbone by grafting or copolymerization via its double bond.

According to the invention, the thermoplastic composition comprises:
  from 40 to 90% by weight of the polyolefin backbone comprising the unsaturated monomer (X);
  from 5 to 40%, preferably 15 to 30%, by weight of polyamide grafts; and
  from 5 to 40%, preferably from 10 to 30%, by weight of at least one polymer chosen from a saponified ethylene vinyl acetate copolymer (EVOH) and a polyamide.

The presence of at least one polymer chosen from a saponified ethylene vinyl acetate copolymer (EVOH) and a polyamide makes it possible to give the thermoplastic composition, in combination with the functionalized polyolefin grafted with polyamides, significantly improved properties in terms of resistance to aging in oils, relative to a thermoplastic composition comprising a functionalized polyolefin grafted with polyamides, but lacking at least one such polymer.

According to one advantageous version of the invention, the polyamide grafts have a molecular weight between 1000 and 5000 g/mol, preferably between 2000 and 3000 g/mol.

Preferentially, the polyamide of the grafts is a monofunctional polyamide, that has either an amine end group or a carboxylic end group.

Such a monofunctional polyamide is advantageously chosen from nylon-6, nylon-11, nylon-12, nylon-6/11 and nylon-6/12.

More preferentially, a monoamine polyamide is used.

According to one advantageous version of the invention, the unsaturated monomer (X) is chosen from an unsaturated carboxylic acid anhydride and an unsaturated epoxide.

Preferably, the polyolefin backbone onto which the unsaturated monomer (X) is attached is chosen from the ethylene/maleic anhydride copolymer, the ethylene/alkyl (meth)acrylate/maleic anhydride terpolymer and the ethylene/alkyl (meth)acrylate/glycidyl(meth)acrylate terpolymer.

Preferably, there are at least 1.3 unsaturated monomers (X) attached to the polyolefin backbone.

According to a first embodiment, the saponified ethylene vinyl acetate copolymer, also designated ethylene/vinyl alcohol copolymer or else EVOH, has an ethylene content of between 20 and 60 mol %, preferably between 29 and 48 mol %, and a melt flow index (MFI) between 2 and 30 g/10 min (measured at 210° C./2.16 kg).

According to a second embodiment, the polyamide may be a polyamide, such as PA-6, PA-11, PA-12, PA-6,6, or else a copolyamide, among which mention may especially be made of nylon-6/11, nylon-6/12 and nylon-6/6,6. Nothing prevents a blend of two or more of these polyamides and/or copolyamides from being envisaged.

Preferably, the molecular weight of the polyamide is greater than or equal to 10,000 g/mol. The expression "high molecular weight" is intended to mean this range of molecular weights.

Particularly advantageously, the polyamide is of the same chemical nature as the polyamide of the grafts.

BRIEF DESCRIPTION OF THE DRAWINGS

FIG. 1: Transmission electron microscopy images of Examples 5, 7, and 8.

FIG. 2. Transmission electron microscopy images of Examples 14 and 16.

DETAILED DESCRIPTION OF THE INVENTION

Conventionally, the composition conforming to the invention may comprise, in addition, one or more additives, such as antioxidants or heat stabilizers.

The present invention also relates to the use of the aforementioned thermoplastic composition.

According to the invention, the use of this thermoplastic composition is envisaged for manufacturing parts, preferably by extrusion or injection moulding, especially for the automotive industry, in particular parts placed "under the engine bonnet".

The compositions that are resistant to aging in oil according to the invention, find an advantageous use in manufacturing parts such as lines or pipes for transferring fluids, for example fuel or coolant, seals or coating layers or sleeves for protecting cables.

The grafted copolymer having polyamide blocks may be obtained by reaction of a preferably monofunctional polyamide, which has either a reactive end group that is an amine functional group, or a reactive end group that is a carboxylic acid functional group, with the residues of an unsaturated monomer X attached by grafting or copolymerization to a polyolefin backbone.

The unsaturated monomer (X) is preferably chosen from an unsaturated carboxylic acid anhydride and an unsaturated epoxide.

In particular, in the case where the reactive end group of the polyamide graft is a carboxylic acid functional group, the unsaturated monomer (X) is an unsaturated epoxide.

In the case where the reactive end group of the polyamide graft is an amine functional group, the unsaturated monomer (X) may be an unsaturated epoxide, or an unsaturated carboxylic acid anhydride.

Whether it is in the case of an amine end group or a carboxylic acid end group, the unsaturated epoxide may be chosen from aliphatic glycidyl esters and ethers such as allyl glycidyl ether, vinyl glycidyl ether, glycidyl maleate and itaconate, glycidyl acrylate and methacrylate, alicyclic glycidyl esters and ethers such as diglycidyl 4,5-cyclohex-2-enedicarboxylate, glycidyl 4-cyclohexenecarboxylate, glycidyl 5-norbornene-2-methyl-2-carboxylate, and diglycidyl endocis-bicyclo-[2.2.1]hept-5-ene-2,3-dicarboxylate.

The unsaturated carboxylic acid anhydride may be chosen from maleic, itaconic, citraconic, allyl succinic, 1,2-cyclohex-4-enedicarboxylic, 4-methylene-1,2-cyclohex-4-enedicarboxylic, bicyclo[2.2.1]hept-5-ene-2,3-dicarboxylic and x-methylbicyclo[2.2.1]hept-5-ene-2,2-dicarboxylic anhydrides. Advantageously maleic anhydride is used.

It would not be outside the scope of the invention to replace all or part of the unsaturated carboxylic acid anhydride with an unsaturated carboxylic acid such as, for example (meth)acrylic acid.

Advantageously, a polyamide having an amine functionality is used.

Regarding the polyolefin backbone, a polyolefin is defined as a homopolymer or copolymer of α-olefins or diolefins, such as for example, ethylene, propylene, 1-butene, 1-octene, or butadiene. By way of example, mention may be made of:
  homopolymers and copolymers of polyethylene, in particular LDPE, HDPE, LLDPE (linear low density polyethylene), VLDPE (very low density polyethylene) and metallocene polyethylene;
  homopolymers or copolymers of propylene;
  ethylene/α-olefin copolymers such as ethylene/propylene copolymers, EPRs (ethylene-propylene rubber) and ethylene-propylene-diene monomer (EPDM) copolymers;
  styrene/ethylene-butene/styrene (SEBS), styrene/butadiene/styrene (SBS), styrene/isoprene/styrene (SIS) and styrene/ethylene-propylene/styrene (SEPS) block copolymers; and
  copolymers of ethylene with at least one product chosen from salts or esters of unsaturated carboxylic acids such as alkyl(meth)acrylate (for example, methyl acrylate), or vinyl esters of saturated carboxylic acids such as vinyl acetate, the amount of comonomer possibly reaching 40% by weight.

Advantageously the polyolefin backbones onto which the residues of unsaturated monomer X are attached are polyethylenes grafted by this unsaturated monomer X or copolymers of ethylene and of unsaturated monomer X that are obtained, for example, by radical polymerization.

Regarding the polyethylenes onto which the unsaturated monomer X will be grafted, polyethylene is understood to mean homopolymers of ethylene and also copolymers of ethylene with one or more comonomers.

As comonomers, mention may be made of:
  α-olefins, advantageously those having from 3 to 30 carbon atoms. Examples have been given above. These α-olefins may be used alone or as a blend of two or more than two;

esters of unsaturated carboxylic acids such as, for example, alkyl(meth)acrylates, the alkyl groups possibly having up to 24 carbon atoms, examples of alkyl acrylates or methacrylates are especially methyl methacrylate, ethyl acrylate, n-butyl acrylate, isobutyl acrylate and 2-ethylhexyl acrylate;

vinyl esters of saturated carboxylic acids such as for example, vinyl acetate or propionate; and dienes such as for example, 1,4-hexadiene.

Advantageously, the polyethylene, which may be a blend of several polymers, comprises at least 50 mol %, and preferably 75 mol %, of ethylene; its density may be between 0.86 and 0.98 g/cm³. The MFI (melt flow index at 190° C./2.16 kg) is advantageously between 20 and 1000 g/10 min.

As examples of polyethylene, mention may be made of:
low density polyethylene (LDPE);
high density polyethylene (HDPE);
linear low density polyethylene (LLDPE);
very low density polyethylene (VLDPE);
polyethylene obtained by metallocene catalysis;
EPR (ethylene-propylene rubber) elastomers;
EPDM (ethylene-propylene-diene monomer) elastomers;
blends of polyethylene with an EPR or an EPDM; and
ethylene/alkyl(meth)acrylate copolymers possibly containing up to 60% by weight of (meth)acrylate and preferably 2 to 40%.

Grafting is an operation known per se.

Regarding the copolymers of ethylene and the unsaturated monomer X, that is to say those in which the unsaturated monomer X is not grafted, these are copolymers of ethylene, of unsaturated monomer X and, optionally of another monomer possibly being chosen from the comonomers that were mentioned above for the copolymers of ethylene intended to be grafted.

Advantageously, the ethylene/maleic anhydride and ethylene/alkyl(meth)acrylate/maleic anhydride copolymers are used.

These copolymers comprise from 0.2 to 10% by weight of maleic anhydride and from 0 to 40% and preferably 5 to 40% by weight of alkyl(meth)acrylate. Their MFI is between 5 and 100 (190° C./2.16 kg). The alkyl(meth)acrylates have already been described above. The melting point is between 60 and 120° C.

According to one advantageous version of the invention, there are on average at least 1.3, advantageously from 1.3 to 10, and preferably from 1.3 to 7 unsaturated monomers X attached to the polyolefin backbone.

A person skilled in the art may easily determine this number of monomers X by FTIR analysis.

For example, if X is maleic anhydride and the polyolefin has a $M_w$ equal to 95,000 g/mol, it has been found that this would correspond to an amount of anhydride of at least 1.5%, preferably from 2.5 to 4% by weight of the whole polyolefin backbone containing X. These values associated with the weight of polyamides having terminal amine groups determine the amount of polyamide and of backbone in the grafted copolymer having polyamide blocks.

Regarding the preferably monofunctional polyamide, having amine or acid end groups, the term "polyamide" is understood to mean products resulting from the condensation:

of one or more amino acids, such as aminocaproic, 7-aminoheptanoic, 11-aminoundecanoic and 12-aminododecanoic acids with one or more lactams, such as caprolactam, oenantholactam and lauryl lactam;

of one or more salts or mixtures of diamines such as hexamethylenediamine, dodecamethylenediamine, metaxylylenediamine, bis(p-aminocyclohexyl)-methane and trimethylhexamethylenediamine with diacids such as isophthalic, terephthalic, adipic, azelaic, suberic, sebacic and dodecanedicarboxylic acids; or blends of several monomers that result in copolyamides.

Blends of polyamides may be used.

Advantageously PA-6, PA-11, PA-12, the copolyamide having 6 units and 11 units (PA-6/11), the copolyamide having 6 units and 12 units (PA-6/12) and the copolyamide based on caprolactam, hexamethylenediamine and adipic acid (PA 6/6,6) are used. More preferably, PA-11 is used.

The degree of polymerization may vary by large amounts, depending on its value it is a polyamide or a polyamide oligomer. In the remainder of the text either of the two expressions will be used for the grafts.

So that the polyamide has a monoamine termination, it is sufficient to use a chain stopper of formula:

in which:

$R_1$ is hydrogen or a linear or branched alkyl group containing up to 20 carbon atoms; and $R_2$ is a linear or branched, alkyl or alkenyl group having up to 20 carbon atoms, a saturated or unsaturated cycloaliphatic radical, an aromatic radical or a combination of the above. The stopper may be, for example, laurylamine or oleylamine.

So that the polyamide has a carboxylic monoacid termination, it is sufficient to use a chain stopper of formula $R'_1$—COOH, $R'_1$—CO—O—CO—$R'_2$ or a dicarboxylic acid.

$R'_1$ and $R'_2$ are linear or branched alkyl groups containing up to 20 carbon atoms.

The preferred amino acid or lactam monomers for synthesizing the monoamine oligomer according to the invention are chosen from caprolactam, 11-aminoundecanoic acid or dodecalactam.

Advantageously, the polyamide has an amine functionality end group. The preferred monofunctional polymerization stoppers are lauryl amine and oleyl amine.

Advantageously, the monofunctional polyamide has a molecular weight between 1000 and 5000 g/mol and preferably between 2000 and 3000.

The polycondensation defined above is carried out according to commonly known methods, for example at a temperature, in general, between 200 and 300° C., under vacuum or in an inert atmosphere, with stirring of the reaction mixture. The average chain length of the oligomer is determined by the initial molar ratio of the polycondensable monomer or the lactam to the monofunctional polymerization stopper. For the average chain length calculation, one molecule of chain stopper is usually counted per one oligomer chain.

The addition of the polyamide monoamine oligomer to the polyolefin backbone containing X is carried out by reaction of one amine functional group of the oligomer with X. Advantageously, X bears an anhydride or acid functional group, thus amide or imide bonds are created.

The addition of the oligomer having amine end groups to the polyolefin backbone containing X is preferably carried out in the melt state. Thus the oligomer and the backbone can be kneaded, in an extruder, at a temperature generally between 230 and 300° C. The average residence time of the molten material in the extruder may be between 5 seconds and 5 minutes, and preferably between 20 seconds and 1 minute. The efficiency of this addition is evaluated by selective extraction of the free polyamide oligomers, that is to say those that have not reacted to form the final grafted copolymer having polyamide blocks.

The preparation of such polyamides having amine end groups and also their addition to a polyolefin backbone containing X is described in U.S. Pat. No. 3,976,720, U.S. Pat. No. 3,963,799, U.S. Pat. No. 5,342,886 and FR 2 291 225.

The grafted copolymers having polyamide blocks of the present invention are characterized by a nanostructured arrangement with polyamide lamellae having a thickness between 10 and 50 nanometers.

Advantageously, the amount of grafted copolymer having polyamide blocks is from 70 to 90% by weight per 30 to 10% respectively of saponified ethylene vinyl acetate copolymer and/or high molecular weight polyamide.

The blends of the invention may be prepared by melt-blending in extruders (single- or twin-screw), Buss kneaders, Brabender mixers and, in general, the usual devices for blending thermoplastic polymers and preferably co-rotating twin-screw extruders.

The blends of the invention may be prepared in one step in an extruder. In the first zones, the backbone containing X, such as an ethylene/alkyl(meth)acrylate/maleic anhydride copolymer and the polyamide having amine end groups are introduced, then, several zones later, the flame retardant is introduced by side feeding.

It is also possible to introduce all the ingredients into the first zone of the extruder.

Regarding the polymer that enables the resistance to aging in oils to be improved, it may be chosen from:
saponified ethylene vinyl acetate copolymers, also known as ethylene/vinyl alcohol copolymers (EVOH), of which the ethylene content is between 20 and 60 mol %; preferably between 29 and 48 mol %. Preferably, these copolymers have a melt flow index or MFI between 2 and 30 g/10 min (measured at 210° C./2.16 kg) and have a degree of saponification of the vinyl acetate of at least 95 mol %; and
a polyamide. A polyamide such as PA-6, PA-11, PA-12 or PA-6,6 or a copolyamide such as PA-6/11, PA-6/12 or PA-6/6,6 may especially be used. Advantageously, a polyamide of the same chemical nature as the polyamide graft is used.

It would not be outside the scope of the invention to use a blend of polyamide with EVOH, for example a blend of PA-6 and EVOH.

Preferably, the compositions of the invention have a dimensional change after aging in oil that is less than or equal to 65%. Advantageously, these compositions have a mass increase after aging in oil that is less than or equal to 75%. More preferably still, these compositions have a dimensional change after aging in oil that is less than or equal to 65% and a mass increase after aging in oil that is less than or equal to 75%. The definitions of the dimensional change, of the mass increase, and also the aging conditions of the compositions are defined in the description of the material characterization methods presented below.

Advantageously, the compositions of the invention have a degree of elongation at break retention after aging in oil that is greater than or equal to 30% or a degree of tensile strength retention after aging in oil that is greater than or equal to 30%. Advantageously, the compositions of the invention have a degree of elongation at break retention after aging in oil that is greater than or equal to 30% and a degree of tensile strength retention after aging in oil that is greater than or equal to 30%. The definitions of the degrees of elongation at break and tensile strength retention, and also the aging conditions of the compositions are defined in the description of the material characterization methods presented below.

The compositions according to the invention may incorporate, in addition, at least one additive chosen from dyes, pigments, brighteners, antioxidants, UV stabilizers or other fillers, for example nanofillers, such as nanoclays or carbon nanotubes.

The compositions of the invention are prepared, either by blending all the compounds (copolymer and additives) in a process known as a "direct process", or by adding the polymer or polymers enabling the resistance to aging in oils to be improved to the already prepared copolymer and PA blend (process known as "rework process").

The description that follows gives examples of thermoplastic compositions that conform to the present invention. This detailed description is made with reference to the tables and the images that are given by way of illustration, but that in no way aim to limit the scope of the present invention.

Materials Used

LOTADER® 7500: ethylene/ethyl acrylate (17.5 wt %)/maleic anhydride (2.8 wt %) terpolymer produced by Arkema having an MFI (190° C./2.16 kg measured according to ISO 1133) of 70 g/10 min.

LOTADER® 3210: ethylene/butyl acrylate (6 wt %)/maleic anhydride (3.1 wt %) terpolymer produced by Arkema having an MFI (190° C./2.16 kg measured according to ISO 1133) of 5 g/10 min.

PA-6 oligomer: nylon-6 terminated with an amine functional group, having a number-average molecular weight ($M_n$) equal to 2500 g/mol, measured by GPC, corresponding to a number of terminal amine functional groups of 400 meq/kg.

ULTRAMID® B4: nylon-6 produced by BASF, characterized by an MVR (melt volume rate at 275° C. under 5 kg measured according to ISO 1133) of 16 $cm^3$/10 min.

DOMAMID® 24: nylon-6 produced by DOMO having a number of terminal amine functional groups of 40 meq/kg and having a relative viscosity at 1% in solution in sulfuric acid (96%) at 20° C. of 2.45±0.05 (BUP-02 method).

DOMAMID® 27: nylon-6 produced by DOMO having a number of terminal amine functional groups of 44 meq/kg and having a relative viscosity at 1% in solution in sulfuric acid (96%) at 20° C. of 2.70±0.05 (BUP-02 method).

PA-11 oligomer: nylon-11 terminated with an amine functional group, having a number-average molecular weight ($M_n$) equal to 2500 g/mol, measured by GPC, corresponding to a number of terminal amine functional groups of 400 meq/kg.

RILSAN® BMNO TLD: nylon-11 produced by Arkema having a number-average molecular weight ($M_n$) equal to 12 000 g/mol measured by GPC (operating conditions: GPC column temperature at 40° C., PA-11 as 1 g/l solution in hexafluoroisopropanol, calibration with a PMMA).

SOARNOL® H4815: ethylene/vinyl alcohol copolymer (EVOH) containing 48 mol % of ethylene units produced by Nippon Gohsei having an MFI of 16 g/10 min (210° C./2.16 kg).

SOARNOL® A4412: ethylene/vinyl alcohol copolymer (EVOH) containing 44 mol % of ethylene units produced by Nippon Gohsei having an MFI of 12 g/10 min (210° C./2.16 kg).

SOARNOL® AT4403: ethylene/vinyl alcohol copolymer (EVOH) containing 44 mol % of ethylene units produced by Nippon Gohsei having an MFI of 3 g/10 min (210° C./2.16 kg).

SOARNOL® DC3212: ethylene/vinyl alcohol copolymer (EVOH) containing 32 mol % of ethylene units produced by Nippon Gohsei having an MFI of 12 g/10 min (210° C./2.16 kg).

SOARNOL® DC3203: ethylene/vinyl alcohol copolymer (EVOH) containing 32 mol % of ethylene units produced by Nippon Gohsei having an MFI of 3 g/10 min (210° C./2.16 kg).

IRGANOX 1098: Hindered phenol type heat stabilizer produced by CIBA.

IRGAFOS 168: Phosphite type heat stabilizer produced by CIBA.

Methods for Manufacturing the Blends

Some of the formulations described below are prepared by compounding using a Coperion Werner and Pfleiderer® ZSK 30 co-rotating twin-screw extruder, of which the barrel elements are heated with a 240° C. flat profile; the rotational speed is 300 rpm with a throughput of 25 kg/h. This process will subsequently be known as W30-1.

The other formulations are prepared according to a variant of the process described above, namely that the temperature profile used is a 260° C. flat profile and the throughput is kg/h for a screw speed of 300 rpm. This process will subsequently be known as W30-2.

In both cases, the products are introduced into zone 1 by twin feeding. On one side, the polyamide oligomer is premixed (manual mixing in a bag) with the Irganox 1098 and the Irgafos 168 and the mixture is introduced using a K-TRON S200 weigh feeder. The EVOH copolymer and the LOTADER® are premixed (manual mixing in a bag) and also introduced using a K-TRON S200 weigh feeder.

Description of the Material Characterization Methods

Production of strips by extrusion: the granules resulting from the synthesis processes were formed using a laboratory ThermoHaake Rheocord System 40 twin-screw extruder equipped with a sheet die, the extruder being heated to 210° C., to give strips from which the test pieces necessary for characterizing the materials will be cut. The thickness of the strips obtained is between 1 and 2.5 mm.

Measurement of the MFI: this is carried out according to the ISO 1133 standard under the following conditions (230° C./2.16 kg) unless otherwise stated.

Aging in oils: IFC (Institut Français du Caoutchouc) type test pieces cut from the strips prepared according to the process described above are soaked in IRM 903 oil for 3 days at 90° C. The IRM 903 oil is a reference (naphthalene) oil used to evaluate the oil resistance of rubbers. It replaces the ASTM No. 3 oil used in the ASTM D471 standard describing the tests for evaluating the fluid resistance of rubbers. The dimensions (width and thickness) and the mass of the test pieces are measured before and after their immersion in the oil. The dimensional changes and the mass increase of each of the test pieces are calculated according to the equations 1 and 2 below:

$$\text{Dimensional change} = [(th \cdot w)_{t=3d} - (th \cdot w)_{t=0}] \times 100 / [(th \cdot w)_{t=0}], \quad (1)$$

where $(th \cdot w)_{t=3d}$ is the product of the thickness th of the test piece and its width w after immersion for 3 days in the oil and $(th \cdot w)_{t=0}$ is the product of the thickness of the test piece and its width before aging;

$$\text{Mass increase} = [m_{t=3d} - m_{t=0}] \times 100 / m_{t=0}, \quad (2)$$

where $m_{t=3d}$ is the mass of the test piece after immersion for 3 days in the oil and $m_{t=0}$ is the mass of the test piece before aging.

For each formulation, 3 test pieces are aged and the mass increase and dimensional change results are averaged over these three test pieces.

Elongation at break and tensile strength: the elongation at break and the tensile strength are measured under a tensile stress using a Zwick Z010 tensile testing machine on IFC type test pieces. The elongation of the test pieces is measured from the crosshead displacement. The pull rate is 50 mm/min. The mechanical properties of the compositions are evaluated before and after immersion in the oil. A degree of elongation at break and tensile strength retention after aging is calculated according to the equation 3:

$$\text{Degree of retention} = [X_{t=3d} / X_{t=0}] \times 100, \quad (3)$$

where $X_{t=3d}$ is the elongation at break or the tensile strength of the test piece after aging for 3 days and $X_{t=0}$ is the elongation at break or the tensile strength of the test piece before aging.

For each formulation, the mechanical properties before and after aging are averaged over 3 test pieces. The test pieces used to measure the mechanical properties after aging in oil are the same ones on which the dimensional and mass increase measurements were carried out.

Analysis of the morphology: the morphology of the materials is examined on the extruded strips by transmission electron microscopy from ultrafine sections cut at −100° C. perpendicular to the extrusion direction. The sections are immersed in a 2% phosphotungstic acid solution containing benzyl alcohol, to densify essentially the polyamide phase of the material.

To further reveal the EVOH phase of the composition, the sections are exposed for 30 seconds to ruthenium tetraoxide vapours.

Production of films for measuring the permeability: films with a thickness of around 100 μm were produced by extrusion from granules using a Randcastle RCP 0500 laboratory extruder.

Oxygen permeability: the oxygen permeability (OTR expressed in cm$^3$·100 μm/m$^2$·24 h of extruded films prepared under the conditions described above was measured at 23° C. and 0% relative humidity using a Systech 8001 permeameter.

EXAMPLES 1 to 8

Oil Resistance Performance of Compositions Based on Nylon-6 Oligomer Grafts and on EVOH Measurements are given in Table 1 below of the oil resistance performances of 8 compositions incorporating EVOH and grafts made from nylon-6 oligomers having $M_n$=2500 g/mol that conform to the invention (Examples 1 to 8) and 2 compositions without any EVOH (comparative examples denoted by CE1 and CE2).

TABLE 1

| Examples | CE1 | CE2 | 1 | 2 | 3 | 4 | 5 | 6 | 7 | 8 |
|---|---|---|---|---|---|---|---|---|---|---|
| Process | W30-1 | W30-2 | W30-1 | W30-1 | W30-1 | W30-1 | W30-1 | W30-1 | W30-1 | W30-1 |
| LOTADER ® 7500 | 79 | 69 | 59 | 49 | 59 | 49 | 59 | 59 | 49 | 49 |
| PA-6 $M_n$ = 2500 | 20 | 30 | 20 | 20 | 30 | 30 | 30 | 30 | 30 | 30 |
| PA-11 $M_n$ = 2500 | | | | | | | | | | |

TABLE 1-continued

| Examples | CE1 | CE2 | 1 | 2 | 3 | 4 | 5 | 6 | 7 | 8 |
|---|---|---|---|---|---|---|---|---|---|---|
| SOARNOL ® H4815 | | | 20 | 30 | 10 | 20 | | | | |
| SOARNOL ® A4412 | | | | | | | 10 | | 20 | |
| SOARNOL ® AT4403 | | | | | | | | 10 | | 20 |
| IRGANOX 1098 | 0.5 | 0.5 | 0.5 | 0.5 | 0.5 | 0.5 | 0.5 | 0.5 | 0.5 | 0.5 |
| IRGAFOS 168 | 0.5 | 0.5 | 0.5 | 0.5 | 0.5 | 0.5 | 0.5 | 0.5 | 0.5 | 0.5 |
| Dimensional change after aging | +74% | +62% | +52% | +38% | +29% | +44% | +46% | +45% | +32% | +34% |
| Mass increase after aging | +92% | +85% | +62% | +38% | +29% | +49% | +57% | +56% | +35% | +40% |
| Initial elongation at break (%) | 570 | 490 | 510 | 410 | 510 | 550 | 520 | 540 | 480 | 470 |
| Degree of elongation at break retention | 21% | 32% | 38% | 50% | 47% | 56% | 56% | 46% | 50% | 46% |
| Initial tensile strength (MPa) | 16 | 21 | 21 | 22 | 27 | 25 | 24 | 25 | 26 | 25 |
| Degree of tensile strength retention | 14% | 28% | 42% | 54% | 51% | 42% | 42% | 35% | 53% | 44% |

EXAMPLES 9 to 12

Oil Resistance Performance of Compositions Based on Nylon-6 Oligomer Grafts and on High Molecular Weight Nylon-6 and of Compositions Based on Nylon-11 Oligomer Grafts and on High Molecular Weight Nylon-11

Data is given in Table 2 below for the swelling and retention of mechanical properties after aging in oil for 2 compositions having nylon-6 oligomer grafts and containing a high molecular weight nylon-6 DOMAMID® 27 (Examples 9 and 10), 2 compositions having nylon-11 oligomer grafts and containing a high molecular weight nylon-11 RILSAN BMNO TLD (Examples 11 and 12), for comparison, for one composition having nylon-6 oligomer grafts without the high molecular weight nylon-6 (Comparative example CE2) and, for comparison, for one composition having nylon-11 oligomer grafts without the high molecular weight nylon-11 (Comparative example CE3).

TABLE 2

| Examples | CE2 | 9 | 10 | CE3 | 11 | 12 |
|---|---|---|---|---|---|---|
| Process | W30-2 | W30-1 | W30-1 | W30-1 | W30-1 | W30-1 |
| LOTADER ® 7500 | 69 | 59 | 49 | 69 | 59 | 49 |
| PA-6 ($M_n$ = 2500 g/mol) | 30 | 30 | 30 | | | |
| PA-11 ($M_n$ = 2500 g/mol) | | | | 30 | 30 | 30 |
| DOMAMID ® 27 | | 10 | 20 | | | |
| RILSAN ® BMNO TLD | | | | | 10 | 20 |
| IRGANOX 1098 | 0.5 | 0.5 | 0.5 | 0.5 | 0.5 | 0.5 |
| IRGAFOS 168 | 0.5 | 0.5 | 0.5 | 0.5 | 0.5 | 0.5 |
| Dimensional change after aging | +62% | +51% | +46% | +72% | +47% | +28% |
| Mass increase after aging | +85% | +56% | +49% | +107% | +49% | +34% |
| Initial elongation at break (%) | 490 | 380 | 380 | 450 | 484 | 398 |
| Degree of elongation at break retention | 32% | 30% | 33% | 33% | 42% | 58% |
| Initial tensile strength (MPa) | 21 | 20 | 23 | 23 | 30 | 28 |
| Degree of tensile strength retention | 28% | 34% | 39% | 20% | 30% | 48% |

EXAMPLES 13 and 14

Oil Resistance Performance of Compositions Based on Nylon-11 Oligomer Grafts and on EVOH Data is given in Table 3 below for the swelling and retention of mechanical properties after aging in oil for 2 compositions having nylon-11 oligomer grafts containing SOARNOL® H4815 EVOH (Examples 13 and 14) and, for comparison, for one composition having nylon-oligomer grafts without the EVOH (comparative example CE4).

TABLE 3

| Examples | CE4 | 13 | 14 |
|---|---|---|---|
| Process | W30-2 | W30-1 | W30-1 |
| LOTADER ® 7500 | 79 | 49 | 49 |
| PA-11 ($M_n$ = 2500 g/mol) | 20 | 20 | 30 |
| SOARNOL ® H4815 | | 30 | 20 |
| IRGANOX 1098 | 0.5 | 0.5 | 0.5 |
| IRGAFOS 168 | 0.5 | 0.5 | 0.5 |

TABLE 3-continued

| Examples | CE4 | 13 | 14 |
|---|---|---|---|
| Dimensional change after aging | +82% | +48% | +36% |
| Mass increase after aging | +114% | +53% | +44% |

TABLE 3-continued

| Examples | CE4 | 13 | 14 |
|---|---|---|---|
| Initial elongation at break (%) | 570 | 300 | 380 |
| Degree of elongation at break retention | 25% | 29% | 30% |
| Initial tensile strength (MPa) | 15 | 21 | 25 |
| Degree of tensile strength retention | 13% | 41% | 37% |

EXAMPLES 5, 7 and 8

Morphology Examples

FIG. 1 shows the transmission electron microscopy images of the formulations corresponding to Examples 5, 7 and 8 whose compositions are indicated in Table 1 above.

These images have been obtained after staining ultrafine sections with ruthenium tetraoxide. The polyamide areas appear in black on the images.

It can be seen from these images that there is no macroseparation of the EVOH phase.

COUNTEREXAMPLES 15 to 18

Oil Resistance Performances and Morphology of Compositions Based on High Molecular Weight Nylon-6 Grafts and on EVOH Four compositions based on LOTADER® 7500, EVOH (SOARNOL® DC3203 and DC 3212) and on commercial non-oligomer polyamides (ULTRAMID® B4 and DOMAMID® 24) were prepared by compounding using a laboratory ThermoHaake Rheocord extruder. The LOTADER®, EVOH and polyamide were premixed (manual mixing in a bag). The blend was then introduced into zone 1 using a K-TRON K2M-T20 weigh feeder.

Given in Table 4 are the oil resistance performances of the 4 compositions corresponding to Examples 15 to 18.

The test pieces produced with these compositions that are made from a LOTADER 7500 matrix, the melting point of which is 85° C., were completely melted and destroyed after a period of 3 days at 90° C. in the oil.

TABLE 4

| Examples | 15 | 16 | 17 | 18 |
|---|---|---|---|---|
| LOTADER ® 7500 | 50 | 50 | 50 | 50 |
| ULTRAMID ® B4 | 20 | 30 | | |
| DOMAMID ® 24 | | | 20 | 30 |
| SOARNOL ® DC3203 | 30 | 20 | | |
| SOARNOL ® DC3212 | | | 30 | 20 |
| Dimensional change after aging | Test pieces destroyed. Not measurable | Test pieces destroyed. Not measurable | Test pieces destroyed. Not measurable | Test pieces destroyed. Not measurable |
| Mass increase after aging | Test pieces destroyed. Not measurable | Test pieces destroyed. Not measurable | Test pieces destroyed. Not measurable | Test pieces destroyed. Not measurable |
| Degree of elongation retention | 0 (not measurable) | 0 (not measurable) | 0 (not measurable) | 0 (not measurable) |
| Degree of tensile strength retention | 0 (not measurable) | 0 (not measurable) | 0 (not measurable) | 0 (not measurable) |

FIG. 2 represents the morphologies obtained by transmission electron microscopy of the compositions corresponding to Examples 16 and 18 described above.

In the compositions of Examples 16 and 18, the nylon-6 phase appears in black and the EVOH nodules appear slightly grey. The scale bar corresponds to 1 micrometer.

EXAMPLE 17

Oxygen Permeability Performance of Compositions Based on Nylon-6 Oligomer Grafts and on EVOH Given in Table 5 below, are the data for the oxygen permeability of a composition according to the invention based on LOTADER® 3210, nylon-6 ($M_n$=2500 g/mol) and SOARNOL® H4815 (Example 19) and, for comparison, of a composition without EVOH (comparative example denoted by CE5).

TABLE 5

| Example | CE5 | 19 |
|---|---|---|
| LOTADER ® 3210 | 79 | 59 |
| PA-6 ($M_n$ = 2500 g/mol) | 20 | 20 |
| SOARNOL ® H4815 | | 20 |
| IRGANOX 1098 | 0.5 | 0.5 |
| IRGAFOS 168 | 0.5 | 0.5 |
| Oxygen permeability ($cm^3 \cdot 100 \, \mu m/m^2 \cdot 24 \, h$) | 1625 ± 59 | 77 ± 1 |

The invention claimed is:

1. Flexible thermoplastic grafted copolymer composition having a high thermomechanical strength and being resistant to aging in oil, comprising a blend of a grafted copolymer having polyamide blocks, and ethylene/vinyl alcohol copolymer (EVOH) having a degree of saponification of at least 95 mol %, wherein said grafted copolymer having polyamide blocks, is formed from a polyolefin backbone and from at least one polyamide graft in which:
- the grafts are attached to the backbone by the residues of an unsaturated monomer (X) having a functional group capable of reacting with a polyamide having an amine end group or a carboxylic acid end group;
- the residues of the unsaturated monomer (X) are attached to the backbone by grafting or copolymerization via its double bond;

wherein said grafted copolymer composition comprises:
- from 40 to 90% by weight of said polyolefin backbone comprising the unsaturated monomer (X);
- from 5 to 40% by weight of said polyamide grafts; and
- from 5 to 40% by weight of said at least one EVOH copolymer, wherein said EVOH copolymer has an ethylene content of between 20 and 60 mol %, and a melt flow index (MFI) between 2 and 30 g/10 min (measured at 210° C. under 2.16 kg).

2. Thermoplastic composition according to claim 1, wherein the polyamide grafts have a molecular weight between 1000 and 5000 g/mol.

3. Thermoplastic composition according to claim 1, wherein the polyamide of the grafts is a monofunctional polyamide.

4. Thermoplastic composition according to claim 1, wherein the unsaturated monomer (X) is chosen from an unsaturated carboxylic acid anhydride and an unsaturated epoxide.

5. Thermoplastic composition according to claim 4, wherein the polyolefin backbone onto which the unsaturated monomer (X) is attached is chosen from a ethylene/maleic anhydride copolymer, a ethylene/alkyl (meth)acrylate/-maleic anhydride terpolymer and a ethylene/alkyl (meth)acrylate/glycidyl(meth)acrylate terpolymer.

6. Thermoplastic composition according to claim 1, wherein there are at least one 1.3 unsaturated monomers (X) attached to the polyolefin backbone.

7. Thermoplastic composition according to claim 1, further comprising antioxidant and/or heat stabilizer additives.

8. A manufactured part comprising the thermoplastic composition according to claim 1.

9. Thermoplastic composition according to claim 1, wherein said grafted copolymer comprises:
- from 40 to 90% by weight of the polyolefin backbone comprising the unsaturated monomer (X);
- from 15 to 30%, by weight of polyamide grafts; and
- from 10 to 30%, by weight of said EVOH copolymer.

10. Thermoplastic composition according to claim 2, wherein the polyamide grafts have a molecular weight between 2000 and 3000 g/mol.

11. Thermoplastic composition according to claim 3 wherein said monofunctional polyamide, is chosen from nylon-6, nylon-11, nylon-12, nylon-6/11 and nylon-6/12.

12. Thermoplastic composition according to claim 1, wherein the EVOH copolymer has an ethylene content of between 29 and 48 mol %.

13. The thermoplastic composition according to claim 8, wherein said manufactured part is an automotive part made by extrusion or injection moulding.

* * * * *